(12) United States Patent
Oka et al.

(10) Patent No.: US 10,766,301 B2
(45) Date of Patent: Sep. 8, 2020

(54) REAR WHEEL FIXING MECHANISM FOR A BICYCLE

(71) Applicant: SHIMANO INC., Sakai, Osaka (JP)

(72) Inventors: Tomonari Oka, Sakai (JP); Yuuya Yoneda, Sakai (JP)

(73) Assignee: SHIMANO INC., Osaka (JP)

( * ) Notice: Subject to any disclaimer, the term of this patent is extended or adjusted under 35 U.S.C. 154(b) by 183 days.

(21) Appl. No.: 15/842,154

(22) Filed: Dec. 14, 2017

(65) Prior Publication Data
US 2019/0184741 A1    Jun. 20, 2019

(51) Int. Cl.
*B60B 27/02* (2006.01)
*B60B 35/00* (2006.01)
*B62K 25/02* (2006.01)

(52) U.S. Cl.
CPC .......... *B60B 27/023* (2013.01); *B60B 35/004* (2013.01); *B62K 25/02* (2013.01); *B62K 2025/025* (2013.01)

(58) Field of Classification Search
CPC ..... B60B 27/023; B60B 35/004; B62K 25/02; B62K 2025/025
USPC ............................................ 301/124.2, 110.5
See application file for complete search history.

(56) References Cited

U.S. PATENT DOCUMENTS

| 6,382,381 B1* | 5/2002 | Okajima | B60B 1/0215 |
| | | | 192/64 |
| 7,731,214 B2 | 6/2010 | Laird | |
| 2002/0067068 A1* | 6/2002 | Kanehisa | B60B 27/026 |
| | | | 301/110.5 |
| 2006/0087096 A1* | 4/2006 | Turner | B62K 25/08 |
| | | | 280/279 |
| 2016/0052588 A1* | 2/2016 | Walthert | B60B 27/026 |
| | | | 280/210 |
| 2016/0368318 A1* | 12/2016 | Van Druten | B60B 27/023 |
| 2017/0036729 A1 | 2/2017 | Nakajima | |
| 2018/0265169 A1* | 9/2018 | Braedt | B62K 25/02 |

* cited by examiner

*Primary Examiner* — S. Joseph Morano
*Assistant Examiner* — Jean W Charleston
(74) *Attorney, Agent, or Firm* — Oliff PLC

(57) ABSTRACT

A rear wheel fixing mechanism for a bicycle is provided that includes an axle, a rear hub body, and a first clamp. The rear hub body is rotatably mounted around the axle about a rotational center axis. The first clamp is configured to exert a first clamping force in a perpendicular direction with respect to the rotational center axis onto a first clamping portion of the axle to mount the axle on a frame of the bicycle.

31 Claims, 9 Drawing Sheets

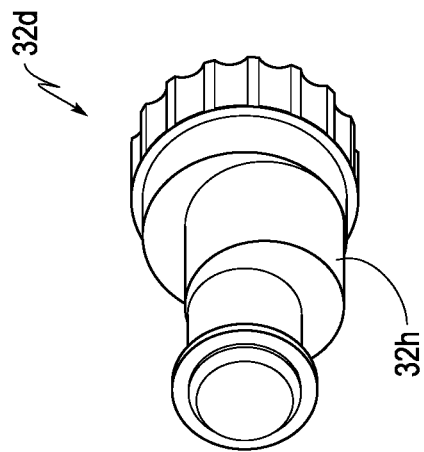
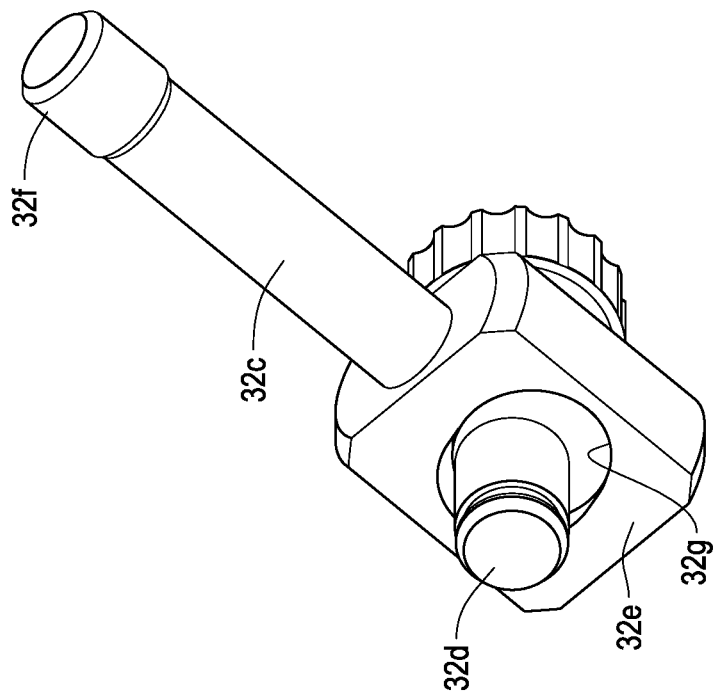
FIG. 2C
FIG. 2B

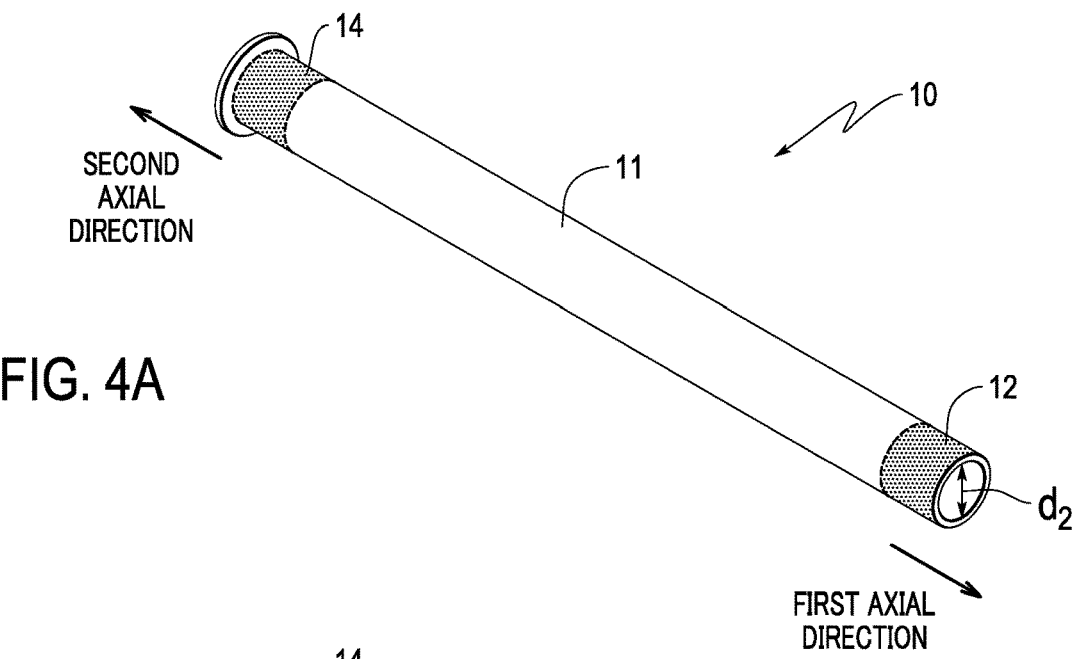
FIG. 4A
FIG. 4B
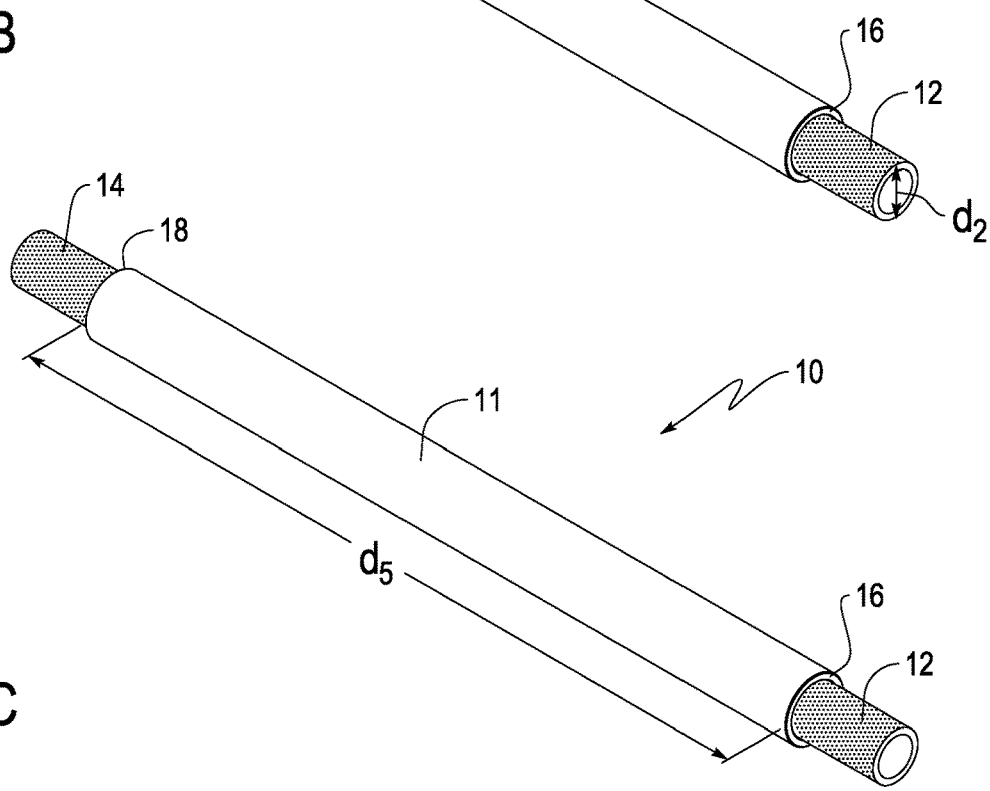
FIG. 4C

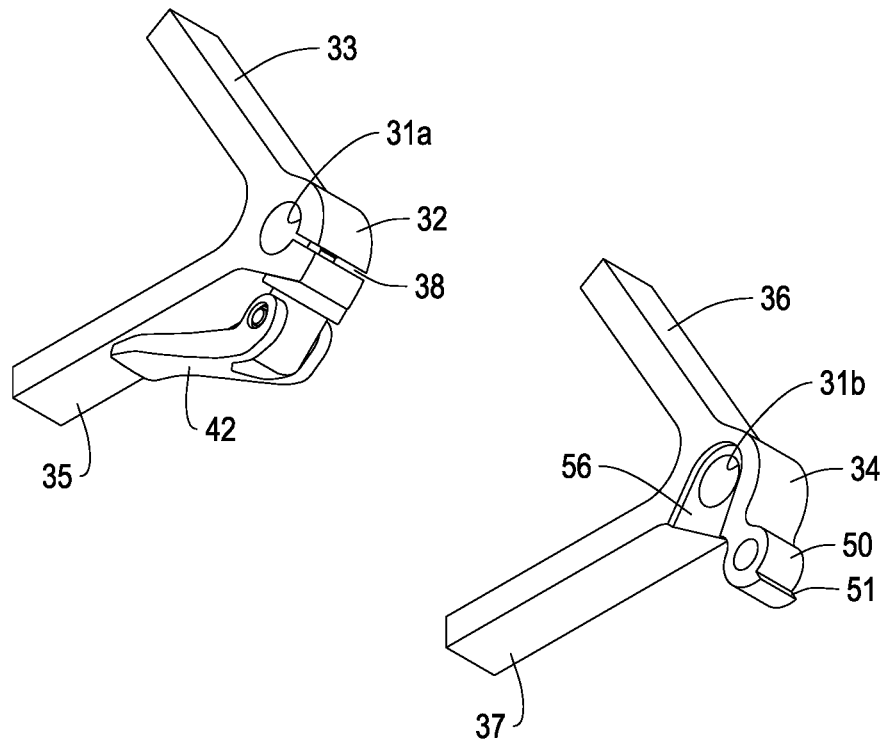
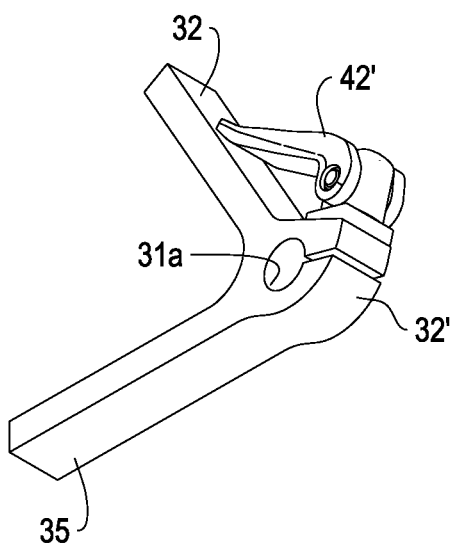 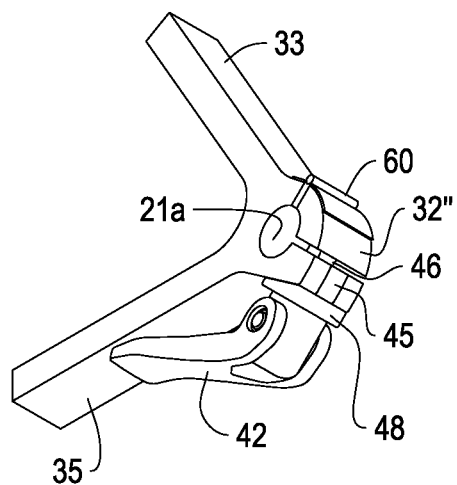
FIG. 5
FIG. 6                    FIG. 7

REAR WHEEL FIXING MECHANISM FOR A BICYCLE

BACKGROUND

Recently, to improve strength and stiffness, performance-oriented bicycles have employed a through-axle wheel hub design in which a removable axle is inserted through a hole in a bicycle frame, through the wheel hub, and then into another hole in the bicycle frame. This is different from a quick-release system in which the axle can simply be inserted into semi-circular drop-outs from below the drop-outs. According to the through-axle design, the axle can be provided with integrated cam levers that compress either the axle or the hub body in an axial direction of the axle between elements of the bicycle frame by applying an axial compressive force on the surfaces of the rear hub or rear axle that contact the bicycle frame.

SUMMARY

Due to the increasing number of rear sprockets used on rear bicycle wheel hubs, the surfaces of the rear hub or rear axle that contact the bicycle frame are becoming smaller and smaller. These small surfaces are required to accept the entirety of the axial compressive force used to hold the rear axle and the hub body in place within the bicycle frame. However, it can be difficult to design such small surfaces that are capable of reliably and repeatedly withstanding such an axial compressive force. Thus, an alternative means of reliably and repeatedly holding a rear axle and hub body within a bicycle frame is needed. Exemplary embodiments of the inventive bicycle pedal described herein address this need. For example, exemplary embodiments hold a rear axle and hub body within a bicycle frame without relying on axial compression of the hub body or the axle to hold the rear wheel in place within the frame.

According to a first aspect of one or more exemplary embodiments, a rear wheel fixing mechanism for a bicycle is provided that includes an axle, a rear hub body, and a first clamp. The rear hub body is rotatably mounted around the axle about a rotational center axis. The first clamp is configured to exert a first clamping force in a perpendicular direction with respect to the rotational center axis onto a first clamping portion of the axle to mount the axle on a frame of the bicycle.

According to this configuration, it is possible to mount the rear wheel to the bicycle frame without relying on solely axial compression of the hub body or the axle to hold the rear wheel in place within the frame.

According to a second aspect of one or more exemplary embodiments, the rear wheel fixing mechanism according to the first aspect is arranged so that the first clamp is configured to circumferentially at least partly surround the first clamping portion of the axle. According to this configuration, it is possible to substantially uniformly provide the first clamping force around the circumference of the first clamping portion of the axle.

According to a third aspect of one or more exemplary embodiments, the rear wheel fixing mechanism according to either the first aspect or the second aspect further comprises a first lever configured to apply the first clamping force during a period in which the first lever is moved from a first open position towards a first closed position. According to this configuration, the first clamping force can be selectively applied during mounting of the wheel by using the first lever.

According to a fourth aspect of one or more exemplary embodiments, the rear wheel fixing mechanism according to the third aspects is arranged so that the first lever is configured to release the first clamping force during a period in which the first lever is moved from the first closed position towards the first open position. According to this configuration, the first clamping force can be selectively released during un-mounting of the wheel by using the first lever.

According to a fifth aspect of one or more exemplary embodiments, the rear wheel fixing mechanism according to either the third aspect or the fourth aspect is configured so that the first lever rotates from the first open position towards the first closed position along an arc that is contained within a lever movement plane. At least one of a seatstay and a chainstay of the frame intersects the lever movement plane. According to this configuration, the first lever does not protrude outwardly from the frame in an axial direction of the rotational center axis where it may catch on something or may increase air drag.

According to a sixth aspect of one or more exemplary embodiments, the rear wheel fixing mechanism according to any of the first through fifth aspects is arranged so that the first clamp is configured to exert the first clamping force without exerting an axial compressive force on the rear hub body in a state in which the axle is mounted to the frame by the first clamp. According to this configuration, it is possible to mount the rear wheel to the bicycle frame without relying on axial compression of the hub body or the axle to hold the rear wheel in place within the frame.

According to a seventh aspect of one or more exemplary embodiments, the rear wheel fixing mechanism according to the sixth aspect is configured so that the first clamping force is by itself strong enough to securely hold the hub body in the frame. According to this configuration, it is possible to mount the rear wheel to the bicycle frame without relying on axial compression of the hub body or the axle to hold the rear wheel in place within the frame.

According to an eighth aspect of one or more exemplary embodiments, the rear wheel fixing mechanism according to any of the first through seventh aspects is configured so that the first clamp is integrally provided as part of the frame. According to this configuration, it is possible to reduce an overall number of parts.

According to an ninth aspect of one or more exemplary embodiments, the rear wheel fixing mechanism according to any of the first through eighth aspects is configured so that the frame includes a mounting bore configured to mount the axle. The mounting bore has a bore minimum inner diameter equal to or larger than 13 mm. According to this configuration, it is possible for the axle to have diameter equal to or larger than 13 mm.

According to a tenth aspect of one or more exemplary embodiments, the rear wheel fixing mechanism according to the ninth aspect is configured so that the axle has a first maximum outer diameter at the first clamping portion. The first maximum outer diameter is equal to or larger than 13 mm. According to this configuration, it is possible to have a strong and/or rigid axle.

According to a eleventh aspect of one or more exemplary embodiments, the rear wheel fixing mechanism according to either the ninth aspect or the tenth aspect further comprises a spacer provided between the mounting bore and the axle to mount the axle on the frame. According to this configuration, the wheel fixing mechanism is compatible with differently sized axles, and thus it is possible for the axle to have a diameter less than 13 mm.

According to a twelfth aspect of one or more exemplary embodiments, the rear wheel fixing mechanism according to the eleventh aspect is configured so that the axle has a second maximum outer diameter at the first clamping portion. The second maximum outer diameter is smaller than 13 mm. According to this configuration, the wheel fixing mechanism is compatible with differently sized axles, and thus it is possible for the axle to have diameter at the first clamping portion that is less than 13 mm.

According to a thirteenth aspect of one or more exemplary embodiments, the rear wheel fixing mechanism according to any of the first through twelfth aspects further comprises a second clamp. The second clamp is configured to exert a second clamping force in the perpendicular direction of the rotational center axis onto a second clamped portion of the axle to mount the axle on the frame of the bicycle. The first clamping portion is located axially outward of the rear hub body in a first axial direction along the rotational center axis. The second clamping portion is located axially outward of the rear hub body in a second axial direction along the rotational center axis opposite to the first axial direction.

According to this configuration, it is possible to mount the rear wheel to the bicycle frame without relying on solely axial compression of the hub body or the axle to hold the rear wheel in place within the frame.

According to a fourteenth aspect of one or more exemplary embodiments, the rear wheel fixing mechanism according to the thirteenth aspect is arranged so that the second clamp is configured to circumferentially at least partly surround the second end of the axle. According to this configuration, it is possible to substantially uniformly provide the second clamping force around the circumference of the second clamping portion of the axle.

According to a fifteenth aspect of one or more exemplary embodiments, the rear wheel fixing mechanism according to either the thirteenth aspect or the fourteenth aspect further comprises a second lever configured to apply the second clamping force during a period in which the second lever is moved from a second open position towards a second closed position. According to this configuration, the second clamping force can be selectively applied during mounting of the wheel by using the second lever.

According to a sixteenth aspect of one or more exemplary embodiments, the rear wheel fixing mechanism according to the fifteenth aspect is arranged so that the second lever is configured to release the second clamping force during a period in which the second lever is moved from the second closed position towards the second open position. According to this configuration, the second clamping force can be selectively released during un-mounting of the wheel by using the second lever.

According to an seventeenth aspect of one or more exemplary embodiments, the rear wheel fixing mechanism according to any of the thirteenth through sixteenth aspects is configured so that the first clamp and the second clamp are configured to respectively exert the first clamping force and the second clamping force without exerting an axial compressive force on either of the rear hub body or the axle that is by itself strong enough to securely hold the axle in place in a state in which the axle is mounted to the frame by the first clamp and the second clamp.

According to this configuration, it is possible to mount the rear wheel to the bicycle frame without relying on axial compression of the hub body or the axle to hold the rear wheel in place within the frame.

According to an eighteenth aspect of one or more exemplary embodiments, the rear wheel fixing mechanism according to any of the thirteenth through seventeenth aspects is configured so that the first clamp and the second clamp are configured to respectively exert the first clamping force and the second clamping force without exerting any axial compressive force on either the rear hub body or the axle in a state in which the axle is mounted to the frame by the first clamp and the second clamp.

According to this configuration, it is possible to mount the rear wheel to the bicycle frame without relying on axial compression of the hub body or the axle to hold the rear wheel in place within the frame.

According to a nineteenth aspect of one or more exemplary embodiments, the rear wheel fixing mechanism according to any of the first through eighteenth aspects further comprises a bearing contacting both the axle and the rear hub body to allow the hub body to rotate around the axle.

According to a twentieth aspect of one or more exemplary embodiments, the rear wheel fixing mechanism according to any of the first through nineteenth aspects further comprises a derailleur hanger configured to hang a rear derailleur. The derailleur hanger includes a derailleur contact abutment in the perpendicular direction configured to contact an adjust member of the rear derailleur. According to this configuration, the orientation of the derailleur can be easily adjusted.

According to a twenty-first aspect of one or more exemplary embodiments, the rear wheel fixing mechanism according to the twentieth aspect is configured so that the first clamp includes a gap provided as part of the frame, the gap extends closer to the derailleur hanger than to a chainstay of the frame. According to this configuration, it is possible to substantially uniformly provide the first clamping force around the circumference of the first clamping portion of the axle.

According to a twenty-second aspect of one or more exemplary embodiments, the rear wheel fixing mechanism according to either the twentieth aspect or the twenty-first aspect further comprises a first lever rotatably mounted to the frame from a first open position towards a first closed position along an arc that is contained within a lever movement plane, the derailleur hanger intersecting the lever movement plane. According to this configuration, the first clamping force can be selectively applied or released during mounting or un-mounting of the wheel by using the first lever.

According to a twenty-third aspect of one or more exemplary embodiments, a rear hub assembly for a bicycle wheel is provided that includes an axle and a rear hub body. The rear hub body is rotatably mounted around the axle about a rotational center axis. The axle includes a first clamping portion located axially outward of the rear hub body in a first axial direction along the rotational center axis. The first clamping portion is configured to receive a first clamping force applied in a perpendicular direction with respect to the rotational center axis in a state in which the rear axle is mounted to a bicycle frame.

According to this configuration, it is possible to mount the rear wheel to the bicycle frame without relying on solely axial compression of the hub body or the axle to hold the rear wheel in place within the frame.

According to a twenty-fourth aspect of one or more exemplary embodiments, the rear hub assembly according to the twenty-third aspect is configured so that at least one of the axle and the rear hub body includes a first axial frame abutment surface and a second axial frame abutment surface. The first axial frame abutment surface is configured to abut against a first part of the bicycle frame in the first axial direction in a state where the rear axle is mounted to the bicycle frame. The second axial frame abutment surface is configured to abut against a second part of the bicycle frame in a second axial direction along the rotational center axis opposite to the first axial direction in a state where the rear axle is mounted to the bicycle frame. A distance from the first axial frame abutment surface to the second axial frame abutment surface along the rotational center axis is such that the bicycle frame cannot exert an axial compressive force on the first axial frame abutment surface and the second axial frame abutment surface that is by itself strong enough to securely hold the rear axle in place in the state in which the rear axle is mounted to the bicycle frame by the first clamping force.

According to this configuration, it is possible to mount the rear wheel to the bicycle frame without relying on axial compression of the hub body or the axle to hold the rear wheel in place within the frame.

According to a twenty-fifth aspect of one or more exemplary embodiments, the rear hub assembly according to either the twenty-third aspect or the twenty-fourth aspect is configured so that the axle includes a second clamping portion located axially outward of the rear hub body in a second axial direction along the rotational center axis opposite the first axial direction, the second clamping portion configured to receive a second clamping force applied in the perpendicular direction of the rotational center axis in the state in which the rear axle is mounted to the bicycle frame.

According to this configuration, it is possible to mount the rear wheel to the bicycle frame without relying on solely axial compression of the hub body or the axle to hold the rear wheel in place within the frame.

According to a twenty-sixth aspect of one or more exemplary embodiments, the rear hub assembly according to the twenty-fifth aspect is configured so that at least one of the axle and the rear hub body includes a first axial frame abutment surface and a second axial frame abutment surface. The first axial frame abutment surface is configured to abut against a first part of the bicycle frame in the first axial direction in a state where the rear axle is mounted to the bicycle frame. The second axial frame abutment surface is configured to abut against a second part of the bicycle frame in a second axial direction along the rotational center axis opposite to the first axial direction in a state where the rear axle is mounted to the bicycle frame. A distance from the first axial frame abutment surface to the second axial frame abutment surface along the rotational center axis is such that the bicycle frame cannot exert an axial compressive force on the first axial frame abutment surface and the second axial frame abutment surface that is by itself strong enough to securely hold the rear axle in place in the state in which the rear axle is mounted to the bicycle frame by the first clamping force and the second clamping force.

According to this configuration, it is possible to mount the rear wheel to the bicycle frame without relying on axial compression of the hub body or the axle to hold the rear wheel in place within the frame.

According to a twenty-seventh aspect of one or more exemplary embodiments, a rear axle for use with a rear hub of a bicycle wheel is provided that includes a hub mounting portion and a first clamping portion. The hub mounting portion configured to rotatably mount a rear hub so that the rear hub can rotate around a rotational center axis. The first clamping portion is located axially outward of the hub connection portion in a first axial direction along the rotational center axis. The first clamping portion is configured to receive a first clamping force applied in a perpendicular direction with respect to the rotational center axis in a state in which the rear axle is mounted to a bicycle frame.

According to this configuration, it is possible to mount the rear wheel to the bicycle frame without relying on solely axial compression of the hub body or the axle to hold the rear wheel in place within the frame.

According to a twenty-eighth aspect of one or more exemplary embodiments, the rear axle according to the twenty-seventh aspect further comprises a first axial frame abutment surface and a second axial frame abutment surface. The first axial frame abutment surface is configured to abut against a first part of the bicycle frame in the first axial direction in a state where the rear axle is mounted to the bicycle frame. The second axial frame abutment surface is configured to abut against a second part of the bicycle frame in a second axial direction along the rotational center axis opposite to the first axial direction in a state where the rear axle is mounted to the bicycle frame. A distance from the first axial frame abutment surface to the second axial frame abutment surface along the rotational center axis is such that the bicycle frame cannot exert an axial compressive force on the first axial frame abutment surface and the second axial frame abutment surface that is by itself strong enough to securely hold the rear axle in place in the state in which the rear axle is mounted to the bicycle frame by the first clamping force.

According to this configuration, it is possible to mount the rear wheel to the bicycle frame without relying on axial compression of the hub body or the axle to hold the rear wheel in place within the frame.

According to a twenty-ninth aspect of one or more exemplary embodiments, the rear axle according to either the twenty-seventh aspect or the twenty-eighth aspect further comprises a second clamping portion located axially outward of the hub connection portion in a second direction along the rotational center axis opposite the first direction. The second clamping portion configured to receive a second clamping force applied in the perpendicular direction with respect to the rotational center axis in the state in which the rear axle is mounted to the bicycle frame. According to this configuration, it is possible to mount the rear wheel to the bicycle frame without relying on axial compression of the hub body or the axle to hold the rear wheel in place within the frame.

According to a thirtieth aspect of one or more exemplary embodiments, the rear axle according to the twenty-ninth aspect further comprises a first axial frame abutment surface and a second axial frame abutment surface. The first axial frame abutment surface is configured to abut against a first part of the bicycle frame in the first axial direction in a state where the rear axle is mounted to the bicycle frame. The second axial frame abutment surface is configured to abut against a second part of the bicycle frame in a second axial direction along the rotational center axis opposite to the first axial direction in a state where the rear axle is mounted to the bicycle frame. A distance from the first axial frame abutment surface to the second axial frame abutment surface along the rotational center axis is such that the bicycle frame cannot exert an axial compressive force on the first axial frame abutment surface and the second axial frame abutment surface that is by itself strong enough to securely hold the rear axle in place in the state in which the rear axle is mounted to the bicycle frame by the first clamping force and the second clamping force.

According to this configuration, it is possible to mount the rear wheel to the bicycle frame without relying on axial compression of the hub body or the axle to hold the rear wheel in place within the frame.

These and other objects, features, aspects and advantages will become apparent to the skilled artisan from the following detailed description, which taken in conjunction with the annexed drawings, discloses details of certain exemplary embodiments.

BRIEF DESCRIPTION OF THE DRAWINGS

Exemplary embodiments are described below with reference to the following drawings:

FIGS. 2B and 2C depict parts of the claims of the first exemplary embodiment of the rear wheel fixing mechanism;

FIGS. 4A-4C depict alternative configurations of the axle usable with the first exemplary embodiment of the rear wheel fixing mechanism;

FIG. 5 depicts an alternative configuration of the first exemplary embodiment of the rear wheel fixing mechanism in which only a single clamp is used;

FIG. 6 depicts an alternative configuration for either of the first lever or the second lever of the first exemplary embodiment of the rear wheel fixing mechanism;

FIG. 7 depicts an alternative configuration for either of the first lever or the second lever of the first exemplary embodiment of the rear wheel fixing mechanism.

DETAILED DESCRIPTION OF EMBODIMENTS

It will be apparent to the skilled artisan in the bicycle field from this disclosure that the following descriptions of exemplary embodiments are provided as examples only and need not limit the broad inventive principles described herein or included in the appended claims.

Figure 1A:
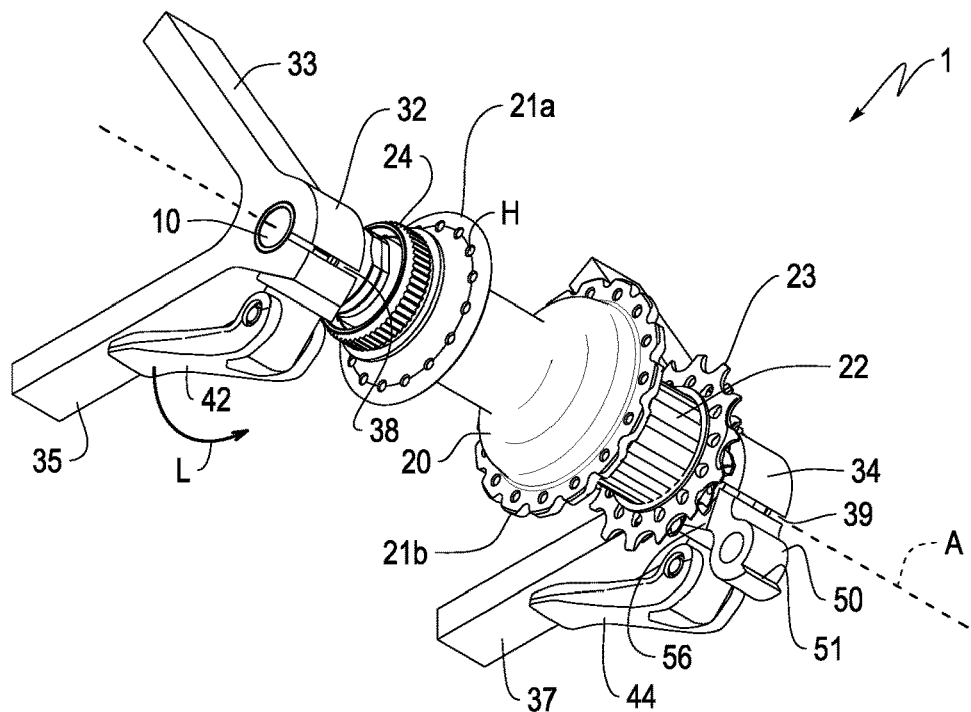
FIGS. 1A-1C depict a first exemplary embodiment of a rear wheel fixing mechanism for a bicycle.
Figure 1B:
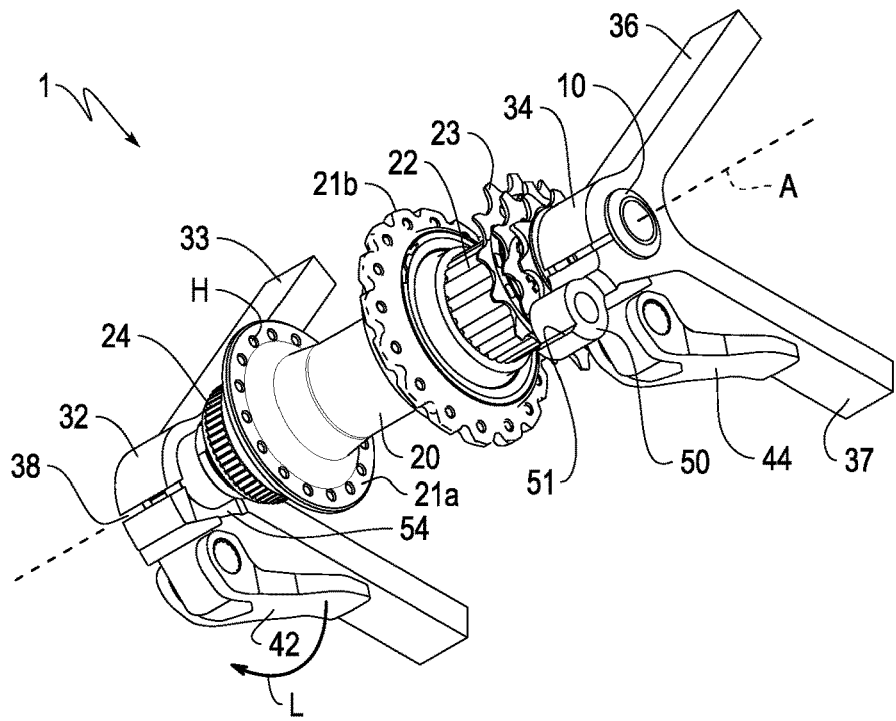
Figure 1C:
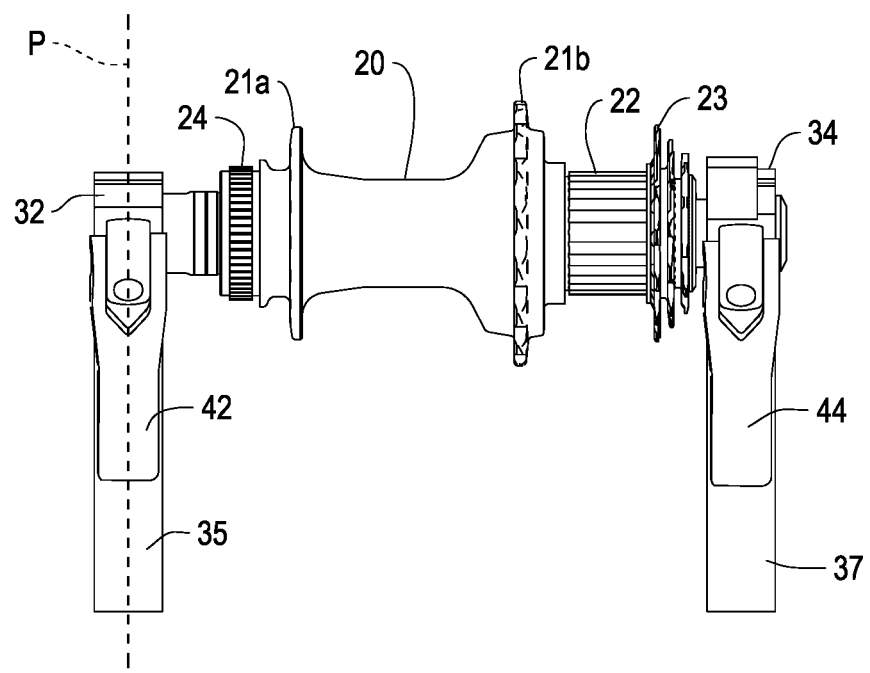

FIGS. 1A-1C depict a first exemplary embodiment of a rear wheel fixing mechanism 1 for a bicycle. The rear wheel fixing mechanism 1 includes an axle 10, a rear hub body 20, and a first clamp 32. The rear hub body 20 is rotatably mounted around the axle 10 about a rotational center axis A, which is located along an axial center of the rear axle 10. That is, as shown in FIG. 4A, a hub mounting portion 11 of the axle 10 is configured to rotatably mount the rear hub body 20 so that the rear hub body 20 can rotate around the rotational center axis A. Typically, the rear hub body 20 will include flanges 21a, 21b, including holes H. The holes H permit the attachment of spokes (not shown) of the rear bicycle wheel (not shown). Typically, the rear hub body 20 will include a cassette-attachment portion 22 onto which sprockets 23 can be attached. The sprockets 23 can be driven by a bicycle chain (not shown) to apply a rotational force to the rear hub body 20 to rotate the rear bicycle wheel. Optionally, the rear hub body 20 can include a disk-attachment portion 24 onto which a disk rotor (not shown) of a disk brake system can be attached.

According to this embodiment, the first clamp 32 is provided as part of the rear triangle of the bicycle frame. That is, the first clamp 32 is attached to a seatstay 33 and chainstay 35 of the bicycle frame. According to this embodiment, the first clamp 32 is integrally provided as part of the frame. However, the first clamp 32 can alternatively be a separate structure attached to the frame. To maintain an appropriate scale, only a portion of the seatstays 33, 36 and chainstays 35, 37 of the frame are shown in the drawings. The first clamp 32 surrounds the axle 10 so that it exerts a first clamping force in a perpendicular direction with respect to the rotational center axis A onto a first clamping portion 12 of the axle 10 to mount the axle 10 on a frame of the bicycle. That is, the first clamping portion 12 is configured to receive the first clamping force. As shown in FIGS. 3A-4A, the first clamping portion 12 is located axially outward of the rear hub body 20 in a first axial direction along the rotational center axis A. As shown in FIGS. 1A and 1B, the first clamp 32 may include a small gap 38 so that the first clamp 32 circumferentially at least partly surrounds the first clamping portion 12 of the axle 10.

According to this embodiment, the rear wheel fixing mechanism 1 is provided with a first lever 42 configured to apply the first clamping force during a period in which the first lever 42 is moved from a first open position towards a first closed position. That is, the first lever 42, when closed, squeezes the gap 38 smaller. When the gap 38 is squeezed smaller, the first clamp 32 tightens around the first clamping portion 12 to hold the axle 10 in place. Conversely, the first lever 42 is configured to release the first clamping force during a period in which the first lever 42 is moved from the first closed position towards the first open position. That is, when the first lever 42 is opened, the gap 38 becomes larger so that the axle 10 can slide out of the first clamp 32.

Figure 2A:
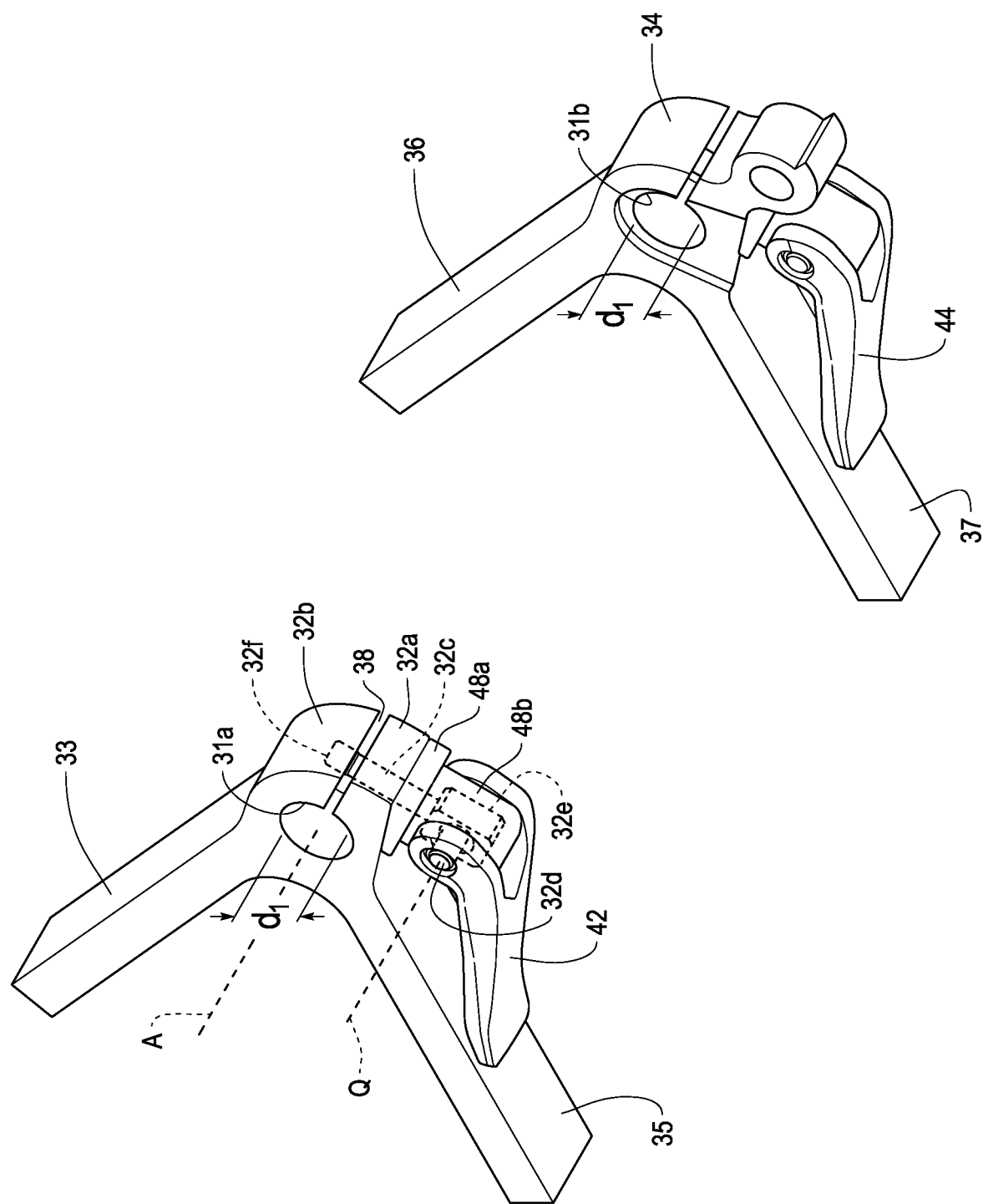
FIG. 2A depicts the clamps of the first exemplary embodiment of the rear wheel fixing mechanism.

For example, as shown in FIGS. 2A-2C, the first clamp 32 includes a first clamp part 32a, a second clamp part 32b, a clamp shaft 32c and a pivot pin 32d. The first clamp part 32a can include a collar 48a and a movable member 48b. The gap 38 is formed between the first clamp part 32a and the second clamp part 32b. The clamp shaft 32c extends across the gap 38 from the first clamp part 32a to the second clamp part 32b along an axial direction of the clamp shaft 32c. The axial direction of the clamp shaft 32c is a perpendicular direction with respect to the rotational center axis A. The clamp shaft 32c includes a first end part 32e and a second end part 32f that is opposite to the first end part 32e. The lever 42 is pivotally connected to the movable member 48b of the first clamp part 32a with respect to a pivot axis Q. The lever 42 is engaged with the pivot pin 32d to rotate with the pivot pin 32d. The second end part 32f of the clamp shaft 32c is connected to the second clamp part 32b. The second end part 32f of the clamp shaft 32c can be embedded in the second clamp part 32b. For example, the second end part 32f of the clamp shaft 32c can be threadedly engaged with the second clamp part 32b.

The first end part 32e of the clamp shaft 32c can include a cam hole 32g. The movable member 48b includes a pin hole having its inner peripheral central axis coincided with the pivot axis Q of the pivot pin 32d. The pivot pin 32d includes a cam portion 32h. The cam portion 32h is provided in the cam hole 32g to translate a pivotal movement of the lever 42 into movement between the clamp shaft 32c and the movable member 48b in the axial direction of the clamp shaft 32c. In other words, the cam portion 32h is provided in the cam hole 32g to provide a relative movement between the first clamp part 32a and the second clamp part 32b in response to the pivotal movement of the lever 42 between the first open position and the first closed position.

As shown in FIGS. 1A and 1B, the first lever 42 rotates from the first open position towards the first closed position along an arc L. As is apparent from FIG. 1C, the arc L is contained within a lever movement plane P. According to this embodiment, the seatstay 33 and the chainstay 35 intersect the lever movement plane P. However, only one of the seatstay 33 and the chainstay 35 of the frame can intersect the lever movement plane P.

Because the first clamp 32 exerts the first clamping force in a perpendicular direction with respect to the rotational center axis A onto the first clamping portion 12, the first clamp 32 is configured to exert the first clamping force without exerting an axial compressive force on the rear hub body 20 in a state in which the axle 10 is mounted to the frame by the first clamp 32. This way, the first clamping force is by itself strong enough to securely hold the hub body 20 in the frame without the need of an axial compressive force. However, an axial compression such as that used with the through-axle design can apply the axial compressive force to securely hold the hub body 20 in the frame in addition to the first clamping force by the first clamp 32.

As shown in FIGS. 1A-1C, according to this embodiment, the rear wheel fixing mechanism 1 can optionally include a second clamp 34. The second clamp 34 is configured to exert a second clamping force in the perpendicular direction of the rotational center axis A onto a second clamped portion 14 of the axle 10 to mount the axle 10 on the frame of the bicycle. As shown in FIGS. 3A-4A, the second clamping portion 14 is located axially outward of the rear hub body 20 in a second axial direction along the rotational center axis A opposite to the first axial direction. When the optional second clamp 34 is not used, the frame can be configured as shown in FIG. 5. In this case, the second mounting bore 31b can include a first threaded portion (not shown) that connects to a second threaded portion (not shown) on the axle 10. Further, when the optional second clamp 34 is not used, the first clamp 32 can be located in the position shown in FIG. 5 or can be located on the side of the frame having the derailleur hanger 50.

Like the first clamp 32, the second clamp 34 is provided as part of the rear triangle of the bicycle frame. That is, the second clamp 34 is attached to a seatstay 36 and chainstay 37 of the bicycle frame. According to this embodiment, the second clamp 34 is integrally provided as part of the frame. However, the second clamp 34 can alternatively be a separate structure attached to the frame. The second clamp 34 surrounds the axle 10 so that it exerts a second clamping force in a perpendicular direction with respect to the rotational center axis A onto the second clamping portion 14 of the axle 10 to mount the axle 10 on a frame of the bicycle. As shown in FIGS. 1A and 1B, the second clamp 34 may include a small gap 39 so that the second clamp 34 circumferentially at least partly surround the second clamping portion 14 of the axle 10.

When the second clamp 34 is used, the rear wheel fixing mechanism 1 is provided with a second lever 44 configured to apply the second clamping force during a period in which the second lever 44 is moved from a second open position towards a second closed position. That is, the second lever 44, when closed, squeezes the gap 39 smaller. When the gap 39 is squeezed smaller, the second clamp 34 tightens around the second clamping portion 14 to hold the axle 10 in place. Conversely, the second lever 44 is configured to release the second clamping force during a period in which the second lever 44 is moved from the second closed position towards the second open position. That is, when the second lever 44 is opened, the gap 39 becomes larger so that the axle 10 can slide out of the second clamp 34.

According to this exemplary embodiment, the first clamp 32 and the second clamp 34 are configured to respectively exert the first clamping force and the second clamping force without exerting an axial compressive force on either of the rear hub body 20 or the axle 10 that is by itself strong enough to securely hold the axle 10 in place in a state in which the axle 10 is mounted to the frame by the first clamp 32 and the second clamp 34. That is, when the axle 10 is mounted in the frame, the frame may itself exert some small amount of compressive force on either or both of the rear hub body 20 or the axle 10 by virtue of the elasticity of the frame material. However, this compressive force will be much smaller than a compressive force that would be necessary to hold the axle 10 in place during use of the bicycle.

Further, when the elasticity of the bicycle frame does not itself exert any compressive force on either or both of the rear hub body 20 or the axle 10, the first clamp 32 and the second clamp 34 can respectively exert the first clamping force and the second clamping force without exerting any axial compressive force on either the rear hub body 20 or the axle 10 in a state in which the axle 10 is mounted to the frame by the first clamp 32 and the second clamp 34. However, the axial compression such as the through-axle design can apply the axial compressive force to securely hold the hub body 20 in the frame in addition to the first clamping force and the second clamping force by the first clamp 32 and the second clamp 34.

As shown in FIGS. 1A and 1B, the rear wheel fixing mechanism 1 can include a derailleur hanger 50 configured to hang a rear derailleur (not shown). The derailleur hanger 50 includes a derailleur contact abutment 51 in the perpendicular direction configured to contact an adjust member (typically a screw) of the rear derailleur.

It should be appreciated that, when the rear wheel fixing mechanism 1 includes only the first clamp 32, the first clamp 32 can be provided on either side of the rear hub body 20. That is, it can be provided on the side with the derailleur hanger 50 or the side without the derailleur hanger 50. The gap 39 is also oriented this way when the rear wheel fixing mechanism 1 includes both the first clamp 32 and the second clamp 34. Further, when the first clamp 32 is provided on the side with the derailleur hanger 50, the gap 39 extends closer to the derailleur hanger 50 than to a chainstay 37 of the frame. When the first clamp 32 is provided on the side with the derailleur hanger 50, the derailleur hanger 50 intersects the lever movement plane P of the first lever 42.

As shown in FIG. 2A, the frame includes a first mounting bore 31a configured to mount the axle 10 within the first clamp 32. The first mounting bore 31a has a bore minimum inner diameter $d_1$ equal to or larger than 13 mm. Correspondingly, as shown in FIG. 4A, the axle 10 has a first maximum outer diameter $d_2$ at the first clamping portion 12 that is equal to or larger than 13 mm. The frame also includes a second mounting bore 31b configured to mount the axle 10 within the second clamp 34. As shown in FIG. 2A, the second mounting bore 31b can also have the bore minimum inner diameter $d_1$ that is equal to or larger than 13 mm. The axle 10 can have the maximum first outer diameter $d_2$ at the second clamping portion 14 that is equal to or larger than 13 mm.

Figure 3A:
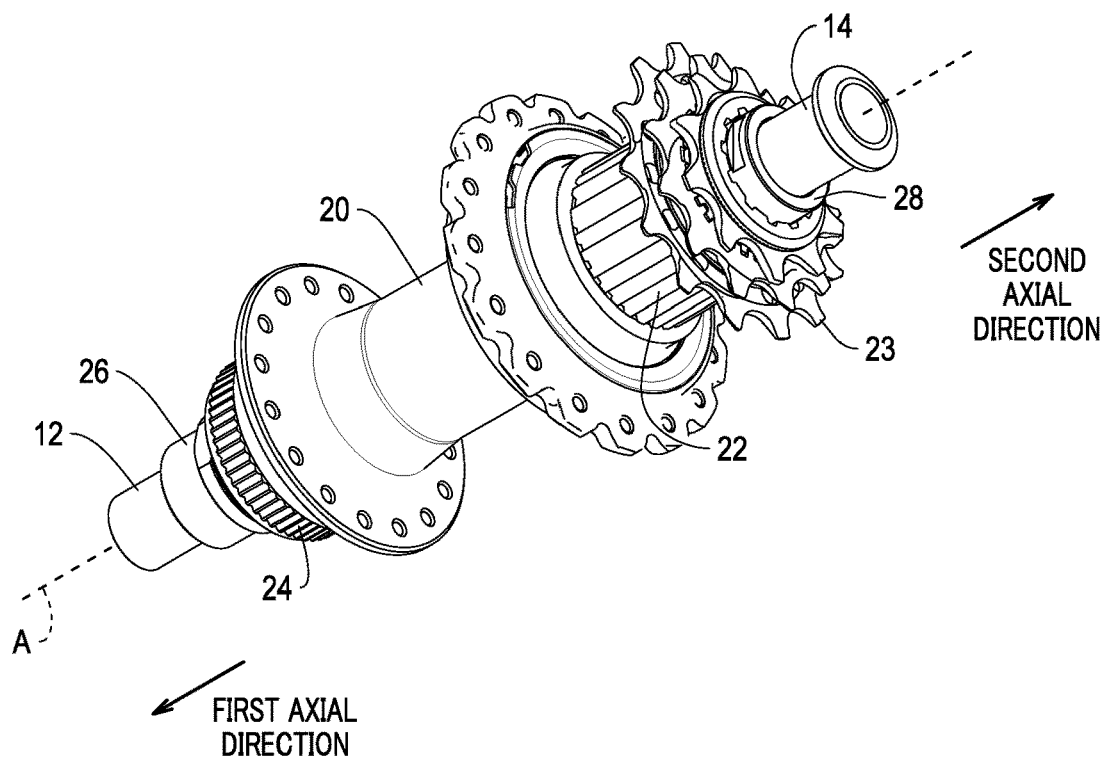
FIGS. 3A-3C depict the axle and hub body of the first exemplary embodiment of the rear wheel fixing mechanism.
Figure 3B:
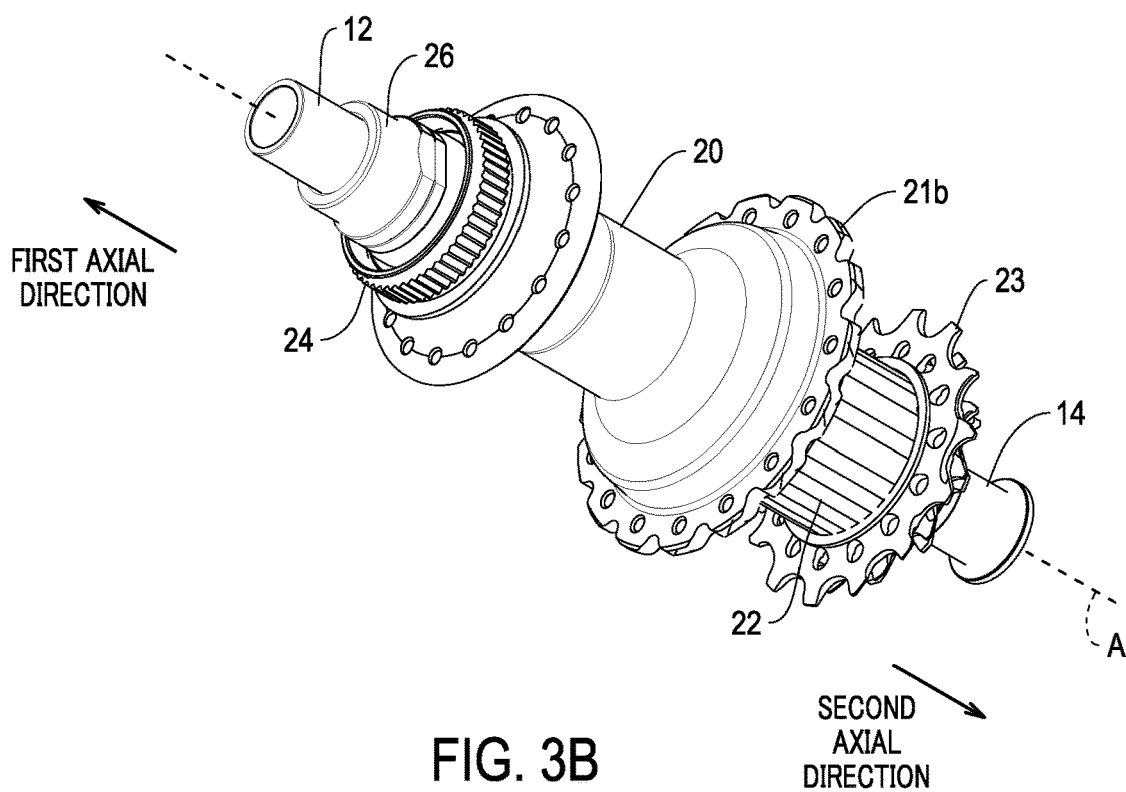
Figure 3C:
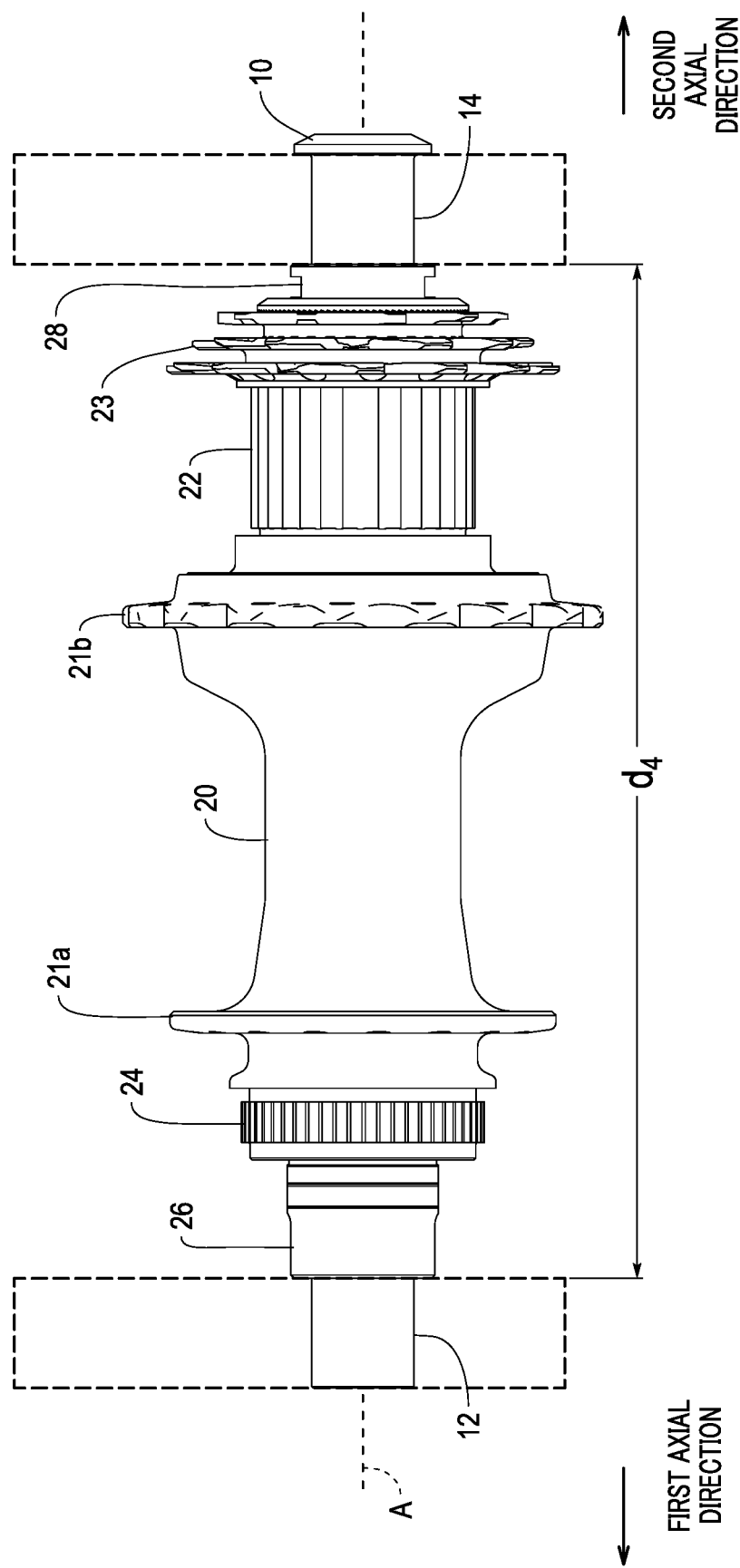

FIGS. 3A-3C show the axle 10 and the rear hub body 20 according to the first exemplary embodiment. The axle 10 includes the first clamping portion 12 located axially outward of the rear hub body 20 in a first axial direction along the rotational center axis A. The rear hub body 20 includes a first axial frame abutment surface 26 and a second axial frame abutment surface 28. The first axial frame abutment surface 26 is configured to abut against a first part 54 of the bicycle frame in the first axial direction. The second axial frame abutment surface 28 is configured to abut against a second part 56 of the bicycle frame in the second axial direction along the rotational center axis A. A distance $d_4$ from the first axial frame abutment surface 26 to the second axial frame abutment surface 28 along the rotational center axis A is such that the bicycle frame cannot exert an axial compressive force on the first axial frame abutment surface 26 and the second axial frame abutment surface 28 that is by itself strong enough to securely hold the rear axle 10 in place in the state in which the rear axle 10 is mounted to the bicycle frame by the first clamping force, if only the first clamp 32 is provided, or by the first clamping force and the second clamping force if both the first clamp 32 and the second clamp 34 are provided.

As an alternative, either or both of the axial frame abutment surfaces can be included on the axle 10. For example, as shown in FIG. 4B, the axle 10 can include first axial frame abutment surface 16 configured to axially abut against the first part 54 of the bicycle frame in the first axial direction. As shown in FIG. 4C, the axle 10 can include second axial frame abutment surface 18 configured to axially abut against the second part 56 of the bicycle frame in the second axial direction. A distance $d_5$ from the first axial frame abutment surface 16 to the second axial frame abutment surface 18 along the rotational center axis A is such that the bicycle frame cannot exert an axial compressive force on the first axial frame abutment surface 16 and the second axial frame abutment surface 18 that is by itself strong enough to securely hold the rear axle 10 in place in the state in which the rear axle 10 is mounted to the bicycle frame by the first clamping force, if only the first clamp 32 is provided, or by the first clamping force and the second clamping force if both the first clamp 32 and the second clamp 34 are provided.

When either or both of the axial frame abutment surfaces 16, 18 are included on the axle 10, the corresponding surface(s) 26, 28 need not be included on the rear hub body 20. Further, when the axial frame abutment surfaces 16, 18 are included on the axle 10, only the first clamping portion 12 and the second clamping portion 14 of the axle 10 need to have the outer diameter $d_2$ that corresponds to the inner diameter $d_1$ of the first clamp 32 and the second clamp 34. A central part of the axle 10 between the axial frame abutment surfaces 16, 18 can have a larger outer diameter. For example, to increase the strength and/or stiffness of the rear hub. In this case, it is possible to mount the rear hub body 20 on the axle 10 by using a bearing (not shown) contacting both the axle 10 and the rear hub body 20 to allow the rear hub body 20 to rotate around the axle 10.

FIG. 6 shows an alternative configuration including a first clamp 32' in place of the first clamp 32. The first clamp 32' has a first lever 42' that is above the first mounting bore 31a making it closer to the seatstay 33 than the chainstay 35 in the closed position. This alternative configuration could also be used to replace the second lever 44 and second clamp 34 of the first embodiment in a similar manner.

FIG. 7 shows an alternative configuration a first clamp 32" in place of the first clamp 32. The first clamp 32" includes a hinge 60 that allows the first clamp 32" to open so that the axle 10 can be inserted through the resulting opening instead of having to slide in through the first mounting bore 31a. Specifically, when the first lever 42 is in the open position, a shaft 46 of the first lever 42 can pass through an opening 45 in the first clamp 32" allowing the hinge 60 to swing upward. When the hinge 60 swings upward, the shaft 46, the lever 42, and a collar 48 of the lever all swing up as well, creating an opening for the axle 10 to pass through. This alternative configuration could also be used to replace the second clamp 34 of the first embodiment in a similar manner.

Figures 8A, 8B:
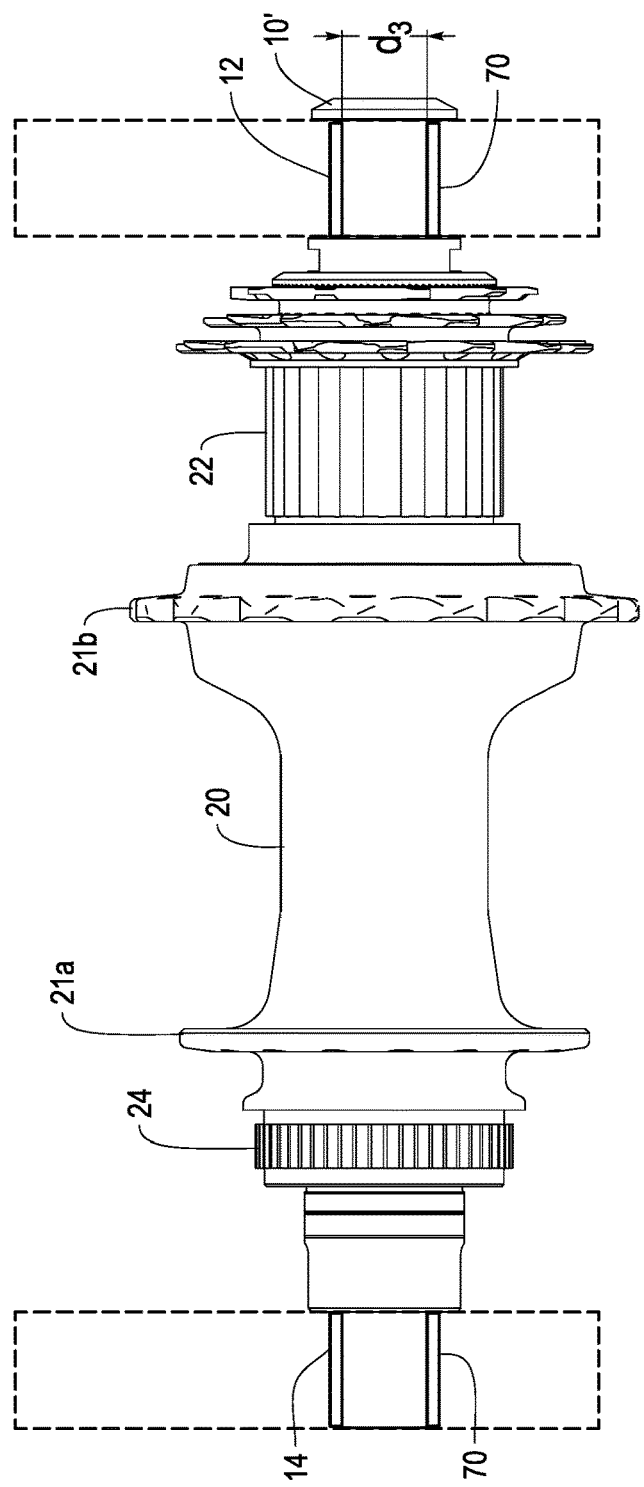
FIGS. 8A and 8B depict an alternative configuration of the first exemplary embodiment of the rear wheel fixing mechanism in which a collar is provided on the axle.

FIGS. 8A and 8B show an alternative configuration that allows for the use of an axle 10' having a smaller outer diameter at least in the areas of the first clamping portion 12 and the second clamping portion 14. In particular, a spacer 70 is provided between the mounting bore 31a and the axle 10' to mount the axle 10' on the frame. By using the spacer 70, the axle 10' can have a second maximum outer diameter $d_3$ at either or both ends. When the spacer 70 is used in conjunction with the first clamp 32, the surface of the spacer 70 becomes the first clamping portion 12. Similarly, when the spacer 70 is used in conjunction with the second clamp 34, the surface of the spacer 70 becomes the second clamping portion 14. This way, the second maximum outer diameter $d_3$ can be smaller than 13 mm, e.g., 12 mm.

In the above description and appended claims, the term "comprising" and its derivatives, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include," and their derivatives. Any terms of degree such as "general," "generally," "substantial," or "substantially" are intended to impart a reasonable amount of deviation to the extent that an end result or intended effect is not significantly changed. Further, as used herein, directional terms, such as "front," "back," "up," "down," "top," "bottom," "over," "under," "inside," "outside" and their derivatives refer to directions as viewed from a state in which a rider of a bicycle is sitting on a saddle of the bicycle in a riding position and facing towards the handlebar. The terms "axial," "radial," "circumferential" and their derivatives refer to directions relative to the rotational center axis A. Finally, in the appended claims, the phrase "mounted state" is intended to describe the positional relationship of claim elements relative to one another or relative to other bicycle parts from the perspective of when they are mounted to the bicycle. The term "mounted state" in the clams is not intended to require that the claimed components are actually mounted to the bicycle.

Each of the alternative configurations described above can be considered to be modifications that can be made to the first exemplary embodiment. Alternatively, each of the alternative configurations described above can be considered to constitute a separate exemplary embodiment. While the exemplary embodiments have been described to explain the inventive principles, it will be apparent to a skilled artisan that various changes and modifications can be made herein without departing from the broad inventive principles. For example, the size, shape, location or orientation of the various components can be changed as needed and/or desired. Components that are shown directly connected or contacting each other can have intermediate structures disposed between them. The functions of one element can be performed by two, and vice versa. It is not necessary for all of the advantages described herein to be achieved by a particular embodiment at the same time. Thus, the foregoing descriptions of the exemplary embodiments need not limit the appended claims unless expressly recited therein.

What is claimed is:

1. A rear wheel fixing mechanism for a bicycle, the rear wheel fixing mechanism comprising:
   an axle;

a rear hub body rotatably mounted around the axle about a rotational center axis;

a first clamp configured to exert a first clamping force in a perpendicular direction with respect to the rotational center axis onto a first clamping portion of the axle to mount the axle on a frame of the bicycle; and a second clamp configured to exert a second clamping force in the perpendicular direction of the rotational center axis onto a second clamped portion of the axle to mount the axle on the frame of the bicycle, the first clamping portion located axially outward of the rear hub body in a first axial direction along the rotational center axis, the second clamping portion located axially outward of the rear hub body in a second axial direction along the rotational center axis opposite to the first axial direction.

2. The rear wheel fixing mechanism of claim 1, wherein:
the first clamp is configured to circumferentially at least partly surround the first clamping portion of the axle.

3. The rear wheel fixing mechanism of claim 1, further comprising:
a first lever configured to apply the first clamping force during a period in which the first lever is moved from a first open position towards a first closed position.

4. The rear wheel fixing mechanism of claim 3, wherein:
the first lever is configured to release the first clamping force during a period in which the first lever is moved from the first closed position towards the first open position.

5. The rear wheel fixing mechanism of claim 3, wherein:
the first lever rotates from the first open position towards the first closed position along an arc that is contained within a lever movement plane; and
at least one of a seatstay and a chainstay of the frame intersects the lever movement plane.

6. The rear wheel fixing mechanism of claim 1, wherein:
the first clamp is configured to exert the first clamping force without exerting an axial compressive force on the rear hub body in a state in which the axle is mounted to the frame by the first clamp.

7. The rear wheel fixing mechanism of claim 6, wherein:
the first clamping force is by itself strong enough to securely hold the hub body in the frame.

8. The rear wheel fixing mechanism of claim 1, wherein:
the first clamp is integrally provided as part of the frame.

9. The rear wheel fixing mechanism of claim 1, wherein:
the frame includes a mounting bore configured to mount the axle, the mounting bore having a bore minimum inner diameter equal to or larger than 13 mm.

10. The rear wheel fixing mechanism of claim 9, wherein:
the axle has a first maximum outer diameter at the first clamping portion, the first maximum outer diameter being equal to or larger than 13 mm.

11. The rear wheel fixing mechanism of claim 9, further comprising:
a spacer provided between the mounting bore and the axle to mount the axle on the frame.

12. The rear wheel fixing mechanism of claim 11, wherein:
the axle has a second maximum outer diameter at the first clamping portion, the second maximum outer diameter being smaller than 13 mm.

13. The rear wheel fixing mechanism of claim 1, wherein:
the second clamp is configured to circumferentially at least partly surround the second clamping portion.

14. The rear wheel fixing mechanism of claim 1, further comprising:

a second lever configured to apply the second clamping force during a period in which the second lever is moved from a second open position towards a second closed position.

15. The rear wheel fixing mechanism of claim 14, wherein:
the second lever is configured to release the second clamping force during a period in which the second lever is moved from the second closed position towards the second open position.

16. The rear wheel fixing mechanism of claim 1, wherein:
the first clamp and the second clamp are configured to respectively exert the first clamping force and the second clamping force without exerting an axial compressive force on either of the rear hub body or the axle that is by itself strong enough to securely hold the axle in place in a state in which the axle is mounted to the frame by the first clamp and the second clamp.

17. The rear wheel fixing mechanism of claim 1, wherein:
the first clamp and the second clamp are configured to respectively exert the first clamping force and the second clamping force without exerting any axial compressive force on either of the rear hub body or the axle in a state in which the axle is mounted to the frame by the first clamp and the second clamp.

18. The rear wheel fixing mechanism of claim 1, further comprising:
a bearing contacting both the axle and the rear hub body to allow the rear hub body to rotate around the axle.

19. The rear wheel fixing mechanism of claim 1, further comprising:
a derailleur hanger configured to hang a rear derailleur, the derailleur hanger including a derailleur contact abutment in the perpendicular direction configured to contact an adjust member of the rear derailleur.

20. The rear wheel fixing mechanism of claim 19, wherein:
the first clamp includes a gap being provided as part of the frame, the gap extending closer to the derailleur hanger than to a chainstay of the frame.

21. The rear wheel fixing mechanism of claim 19, further comprising:
a first lever rotatably mounted to the frame from a first open position towards a first closed position along an arc that is contained within a lever movement plane, the derailleur hanger intersecting the lever movement plane.

22. The rear wheel fixing mechanism of claim 1, wherein:
the first clamp includes a first clamp part, a second clamp part, and a clamp shaft having one end embedded within the first clamp part.

23. The rear wheel fixing mechanism of claim 22, wherein:
a cam portion is provided in the clamp shaft to provide a relative movement between the first clamp part and the second clamp part in response to a pivotal movement of a lever between an open position and a closed position.

24. A rear axle for use with a rear hub of a bicycle wheel, the rear axle comprising:
a hub mounting portion configured to rotatably mount a rear hub so that the rear hub can rotate around a rotational center axis; and
a first clamping portion located axially outward of the hub mounting portion in a first axial direction along the rotational center axis, the first clamping portion being configured to receive a first clamping force applied in a perpendicular direction with respect to the rotational center axis in a state in which the rear axle is mounted to a bicycle frame.

25. A rear hub assembly for a bicycle wheel, the rear hub assembly comprising:
the axle of claim 24; and
a rear hub body rotatably mounted around the axle about a rotational center axis;
wherein the axle incudes a first clamping portion located axially outward of the rear hub body in a first axial direction along the rotational center axis, the first clamping portion configured to receive a first clamping force applied in a perpendicular direction with respect to the rotational center axis in a state in which the rear axle is mounted to a bicycle frame.

26. The rear hub assembly of claim 25, wherein:
at least one of the axle and the rear hub body includes:
a first axial frame abutment surface configured to abut against a first part of the bicycle frame in the first axial direction in a state where the rear axle is mounted to the bicycle frame; and
a second axial frame abutment surface configured to abut against a second part of the bicycle frame in a second axial direction along the rotational center axis opposite to the first axial direction in a state where the rear axle is mounted to the bicycle frame;
wherein a distance from the first axial frame abutment surface to the second axial frame abutment surface along the rotational center axis is such that the bicycle frame cannot exert an axial compressive force on the first axial frame abutment surface and the second axial frame abutment surface that is by itself strong enough to securely hold the rear axle in place in the state in which the rear axle is mounted to the bicycle frame by the first clamping force.

27. The rear hub assembly of claim 25, wherein:
the axle incudes a second clamping portion located axially outward of the rear hub body in a second axial direction along the rotational center axis opposite the first axial direction, the second clamping portion configured to receive a second clamping force applied in the perpendicular direction of the rotational center axis in the state in which the rear axle is mounted to the bicycle frame.

28. The rear hub assembly of claim 27, wherein:
at least one of the axle and the rear hub body includes:
a first axial frame abutment surface configured to abut against a first part of the bicycle frame in the first axial direction in a state where the rear axle is mounted to the bicycle frame; and
a second axial frame abutment surface configured to abut against a second part of the bicycle frame in the second axial direction in a state where the rear axle is mounted to the bicycle frame;
wherein a distance from the first axial frame abutment surface to the second axial frame abutment surface along the rotational center axis is such that the bicycle frame cannot exert an axial compressive force on the first axial frame abutment surface and the second axial frame abutment surface that is by itself strong enough to securely hold the rear axle in place in the state in which the rear axle is mounted to the bicycle frame by the first clamping force and the second clamping force.

29. The rear axle of claim 24, further comprising:
a first axial frame abutment surface configured to abut against a first part of the bicycle frame in the first axial direction in a state where the rear axle is mounted to the bicycle frame; and
a second axial frame abutment surface configured to abut against a second part of the bicycle frame in a second axial direction along the rotational center axis opposite to the first axial direction in a state where the rear axle is mounted to the bicycle frame;
wherein a distance from the first axial frame abutment surface to the second axial frame abutment surface along the rotational center axis is such that the bicycle frame cannot exert an axial compressive force on the first axial frame abutment surface and the second axial frame abutment surface that is by itself strong enough to securely hold the rear axle in place in the state in which the rear axle is mounted to the bicycle frame by the first clamping force.

30. The rear axle of claim 24, further comprising:
a second clamping portion located axially outward of the hub mounting portion in a second direction along the rotational center axis opposite the first direction, the second clamping portion configured to receive a second clamping force applied in the perpendicular direction with respect to the rotational center axis in the state in which the rear axle is mounted to the bicycle frame.

31. The rear axle of claim 30, further comprising:
a first axial frame abutment surface configured to abut against a first part of the bicycle frame in the first axial direction in a state where the rear axle is mounted to the bicycle frame; and
a second axial frame abutment surface configured to abut against a second part of the bicycle frame in the second axial direction in a state where the rear axle is mounted to the bicycle frame;
wherein a distance from the first axial frame abutment surface to the second axial frame abutment surface along the rotational center axis is such that the bicycle frame cannot exert an axial compressive force on the first axial frame abutment surface and the second axial frame abutment surface that is by itself strong enough to securely hold the rear axle in place in the state in which the rear axle is mounted to the bicycle frame by the first clamping force and the second clamping force.

* * * * *